United States Patent [19]

Mandel

[11] 4,435,010
[45] Mar. 6, 1984

[54] OVERHEAD ACCESS ASSEMBLY

[76] Inventor: Richard M. Mandel, 606 Glencoe Rd., Glencoe, Ill. 60022

[21] Appl. No.: 338,520

[22] Filed: Jan. 11, 1982

[51] Int. Cl.$^3$ .............................................. B60P 7/02
[52] U.S. Cl. ..................................... 296/100; 296/15; 105/377; 49/365
[58] Field of Search ......................... 296/100, 216, 40; 105/377, 355; 49/365

[56] References Cited

U.S. PATENT DOCUMENTS

| | | | |
|---|---|---|---|
| 715,384 | 12/1902 | Johnston | 105/377 |
| 3,106,900 | 10/1963 | Gallo et al. | 105/377 |
| 3,831,792 | 8/1974 | Waterman et al. | 105/377 |
| 3,951,447 | 4/1976 | Sharp | 296/100 |
| 4,302,044 | 11/1981 | Sims | 296/100 |

Primary Examiner—Robert R. Song
Attorney, Agent, or Firm—Wood, Dalton, Phillips, Mason & Rowe

[57] ABSTRACT

An improved means for providing overhead access to the freight compartment of a load carrying vehicle to facilitate loading and unloading of cargo. An elongate opening is defined in the roof of the compartment and includes a plurality of hinged door panels that provide a weathertight cover for the opening. Spanning the opening is at least one cross-brace which is rigidly tied to the roof at opposing edges of the opening so as to maintain the opening and afford stability to the opposing sidewalls. The cross-brace, which serves also to seat the door panels, is pivotally secured adjacent one edge about a horizontal axis, preferably at the opposing edge to that where the doors are hinged, such that the panels and cross-braces can be pivoted laterally away from the opening by an individual situated atop the van. When access is had, as in conventional vehicles, through an opening in the sidewalls, or endwall of the vehicle, the invention also contemplates including a movable header over the lower opening. The header, which otherwise divides the region between the overhead and lower openings, can be resituated to afford a continuous unrestricted region therebetween.

23 Claims, 13 Drawing Figures

OVERHEAD ACCESS ASSEMBLY

BACKGROUND OF THE INVENTION

In conventional load carrying vehicles, such as enclosed vans, or the like, an elongate freight compartment is generally formed, with access provided through one or more rearly situated doors and/or through intermediate doors in the vehicle sidewalls. In either construction, it is preferable to arrange the internal load such that the cargo to be first unloaded is situated close to the access opening. Load balancing, however, may dictate an arrangement of cargo that is inconvenient from this standpoint. When the cargo to be unloaded is remote from the opening, for whatever reason, it may be necessary to rearrange the entire load to gain access to the desired cargo.

Typically, heavier cargo is introduced to the van by employing a forklift, which has numerous drawbacks. Most notable of these problems is the fact that the additional height of the lifting bars reduces the size of the cargo that can be fit within the compartment. Further, the use of a forklift is undesirable in that the forklift itself is generally extremely heavy and, during the transfer of the cargo, places an undesirable burden on the van.

To obviate this problem, overhead loading can be accomplished as taught in U.S. Pat. No. 715,384, to H. A. Johnston and U.S. Pat. No. 3,106,900, to J. R. Gallo et al. In each, the roof assembly is removable as a unit. The main drawback with this construction is that the roof assembly may be excessive in weight and is not manipulable by an individual without mechanical assistance. Further, even though access may be desired to only one portion of the compartment, the entire roof has to be removed.

As an alternative to this design, a plurality of interconnecting rigid panels are shown in U.S. Pat. No. 3,951,447 to Sharp. In Sharp, the edges of the panels have an integrally formed flange which cooperates with a flange on the next adjacent panel. The panels are removable by means of a cable connecting a lifting bracket, which bracket serves also to lock the panels in place. To gain access to the compartments, the panels must be removed by an external apparatus capable of drawing the cable. A further drawback with this construction is that the panels must be removed successively due to the interconnection of the flanges. Should access be desired to the rear of the vehicle, all the panels would have to be removed, leaving the sidewalls without any lateral stability between the endwalls of the van.

An additional problem that may be encountered in overhead loading is that of introducing loads that are of a length substantially equal to that of the van. Lateral bracing at the roof, adajcent to the endwalls, may restrict the opening and thus reduce the permissible length of the cargo that can be loaded or unloaded from overhead. The bracing might alternately necessitate tipping of the load, which is an awkward process. Even with the entire roof assembly removed, as in Johnston and Gallo et al, one must be careful in introducing or removing loads approximating the length of the van not to damage the endwalls.

The present invention is directed specifically to overcoming one or more of the problems enumerated above.

SUMMARY OF THE INVENTION

The improved access assembly of the present invention is adaptable to an overhead opening in a load carrying vehicle. The assembly comprises a plurality of hinged door panels which cooperatively seal the opening. At least one hinged cross-brace spans the opening and seats the doors panels.

It is the principal object of the present invention to provide an overhead access assembly that is easily operable by an individual positioned atop the load carrying vehicle. The door panels are preferably constructed of a lightweight material and are easily pivotable outwardly to reveal the opening.

It is another object of the invention to permit ready access to any region of the van. One need only open the door panel immediately over the region where the desired cargo resides. Additionally, the size of the opening may be easily altered, depending upon the size of the cargo.

To accomplish this end, the door panels are independently manipulable. Should an opening larger than that sealed by any individual door panel be desired, the cross-brace, which seats the edges of adjacent door panels, may be pivoted away from the opening so as not to restrict the region between the raised panels. Alternately, the cross-brace might be rigidly secured to the door panel so as to be movable therewith.

It is another object of the invention to provide reinforcement to the vehicle in the vicinity of the opening. Means are included for rigidly tying the ends of the cross-brace with the edge of the roof defining the opening. The means comprise a latch and catch mounted for cooperative engagement to the roof and cross-brace. With the latch and catch engaged, the roof edge and cross-brace are drawn positively towards each other. This affords lateral stability to the sidewalls and maintains the dimension of the opening.

The means also include a centering assembly which comprises a bolt mechanism on one of either the cross-brace or roof. The bolt assembly includes an elongate rod, which is extendable within and retractable from a bore in the other of either the cross-brace or roof. The centering assembly prevents relative longitudinal or vertical shifting of the opposing sidewalls and positively aligns the latch and catch with each other. The means cooperatively increase the overall stability of the vehicle. Preferably, the means are situated on a common side of the cross-brace such that they may be operated by an individual situated upon a closed door panel immediately there adjacent.

It is a further object of the invention to provide an arrangement that affords a weather-tight seal about the opening.

In a preferred form of the invention, the cross-brace comprises a web with a pair of spaced, laterally directed upstanding ledges, with each ledge seating closely beneath a door panel. A gasket is captured between the door panels and the cross-brace and is compressed by a locking mechanism that biases the door panels towards a closed position. A peripheral downturned edge may be included about each panel to deflect rain or foreign objects away from the point of engagement between the door panels and cross-braces, to further guard against leakage.

Generally, the invention contemplates that the above advantages be obtained with the assembly adapted to an opening in the vehicle roof. The invention is equally effective and operates similarly when it is utilized with an open vehicle lacking any roof structure. The door panels and cross-braces, rather than mating with the roof, may be hingedly joined with the upper sidewall region on opposing sides of the opening.

It is a still further object of the invention, as embodied in one variation, to provide a closed vehicle that functions as a flatbed and is suitable for the loading of long or bulky cargo by employing an overhead cable.

Specifically, a movable header is provided above an access opening in either the sidewall or endwall. In a preferred form of the invention, the header is hinged adjacent one edge so as to pivot laterally away from the opening. With the header pivoted outwardly or upward, a continuous, unrestricted opening is formed between the opening in the side or endwall and an overhead opening in the roof. The remainder of the structure functions comparably to the assembly in the previously described embodiment.

DETAILED DESCRIPTION OF THE DRAWINGS

Figure 1:
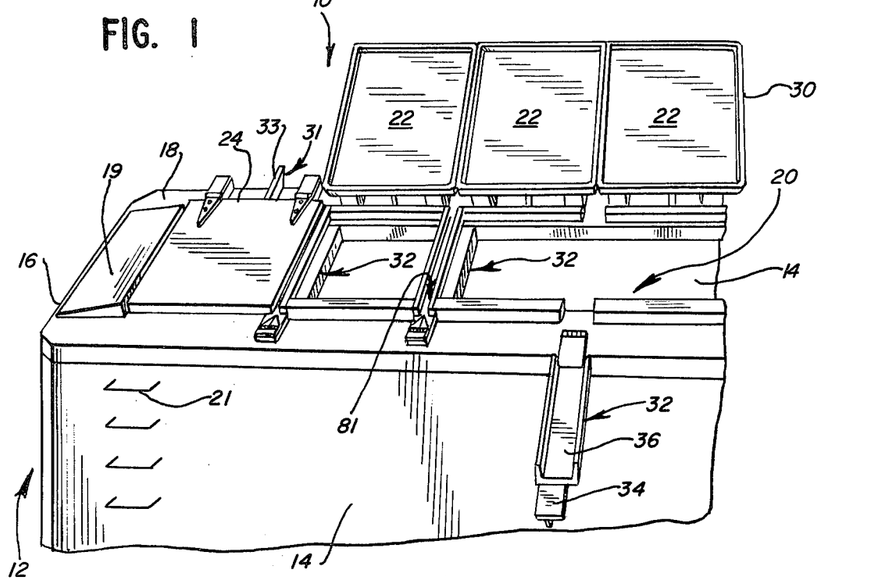
FIG. 1 is a sectional perspective view of a van incorporating the improved overhead access assembly of the present invention with several door panels shown in an open position.
Figure 2:
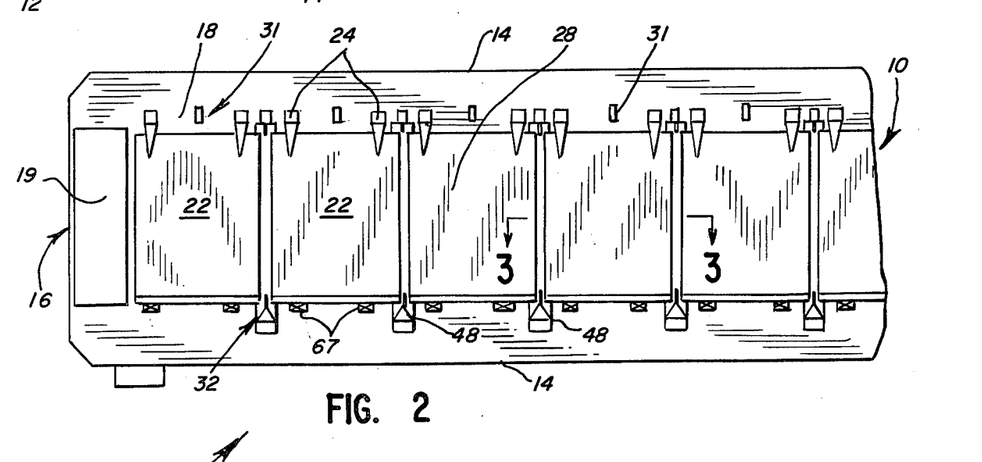
FIG. 2 is a top sectional view of the van in FIG. 1 with all of the door panels in a closed position.
Figure 3:
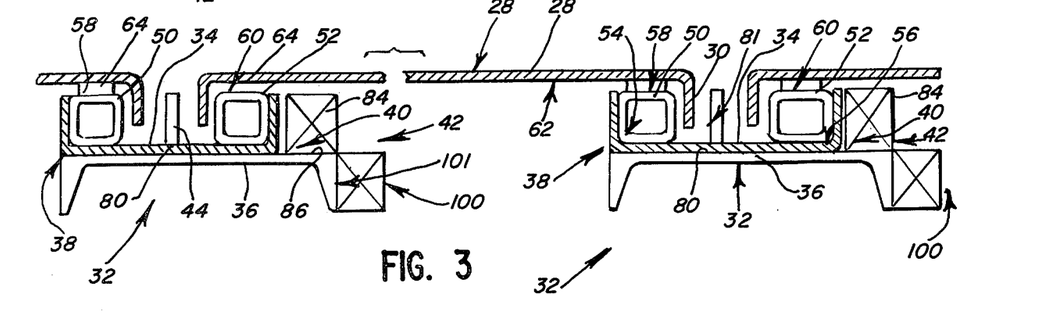
FIG. 3 is a sectional view of the door panels closed against lateral cross-braces that provide a seat therefor, taken along line 3—3 of FIG. 2.

Referring initially to FIGS. 1-3, the overhead access assembly 10 is shown as adapted to a load carrying van 12. The van 12 is formed cooperatively by a floor (not shown), laterally spaced sidewalls 14, opposed endwalls 16 (only front endwall shown), and a roof member 18 defining in its central portion an elongate, framed access opening 20. The sidewalls carry a plurality of steps 21 which permit the operator to scale the van. The steps are preferably collapsible which can be accomplished by means well known in the art. A tapered ledge 19 is included on the roof adjacent the leading edge of the van to deflect the oncoming air and rain and to reduce the drag caused by the access assembly. Loading of the vehicle is accomplished generally through the use of an overhead cable extensible through the opening to introduce and extract cargo from the van.

The opening 20 is sealed by a plurality of longitudinally spaced door panels 22. A pair of strap hinges 24, illustrated in detail in FIG. 5, pivotally secure each door, adjacent a common lateral edge, to the roof. The hinges 24 permit movement of the panels laterally outwardly about a horizontally extending pivot axis 26. The axis 26 is outwardly offset from the edge of the overhead opening 20 sufficiently that the opening will not be restricted in the vertical direction by the open panels. The hinges are mounted in a raised position upon a roof block 29, for reasons that will become evident subsequently.

The details of the doors are shown in FIGS. 1-5. Each door is defined by a substantially planar, rectangular cover surface 28 which terminates in a peripheral downturned flange 30. The doors are preferably of a lightweight material and may be suitably reinforced to afford additional rigidity. The doors are maintained in an open position by a stop 31, which is mounted atop the roof adjacent the hinged edge of the panels. The stop 31 includes an inclined upwardly facing edge 33, which abuts the upper surface of the panels when in an open position, and relieves the pressure on the hinges 24.

A plurality of hinged cross-braces 32 span the opening 20 between adjacent door panels 22, with each cross-brace providing a seat for adjacent panel edges. Each cross-brace is defined by upper and lower U-shaped channel members 34 and 36, respectively, arranged in back-to-back relationship. The upper channel 34 is of a narrower width than the lower channel 36. The channels 34, 36 are aligned flushly at their front edges 38, with the additional rear region 40 of the lower channel 36 serving as a base to receive a tying means 42 (FIGS. 3, 6 and 7), which rigidly secure the ends of the cross-braces with the roof at the edge of the opening 20. The tying means 42 are described in detail in subsequent paragraphs.

The upper channel 34 extends laterally beyond the opposing edges of the roof opening and overlies the roof so as to be bolstered thereby at each end. The lower channel 36 is of a length to fit within the width of the opening so as not to interfere with the roof when the cross-braces are moved. The region of the cross-brace at each end extending laterally beyond the lower channel 36, is reinforced by an upstanding stiffening rib 44. Each cross-brace 32 is pivotally secured at one edge to the roof by means of a strap hinge 48. The cross-braces are pivotable preferably at the opposing edge of the opening to that which the door panels are hinged, such that the cross-braces and panels are movable outwardly in opposite directions, as illustrated in FIG. 1. The cross-braces might, however, be hinged on the same side as the door panels.

Figure 4:
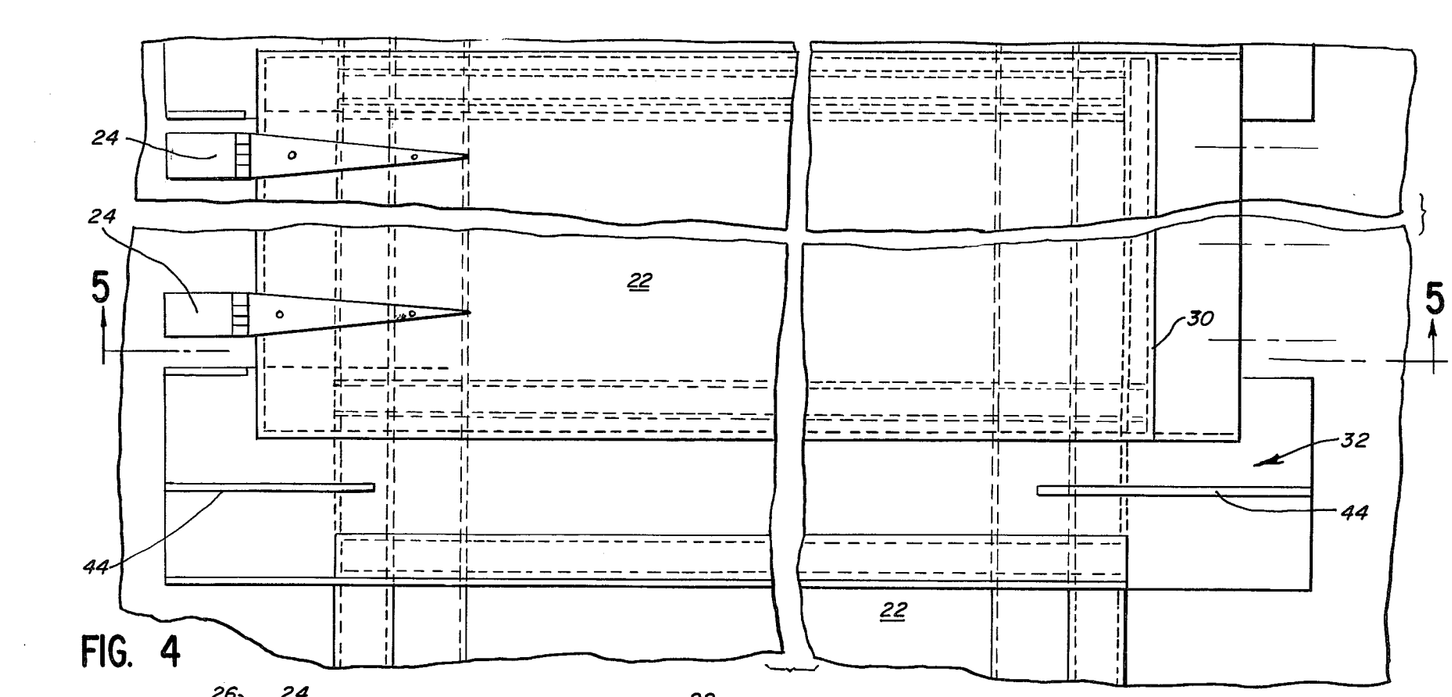
FIG. 4 is an enlarged sectional top view of one of the door panels and cross-braces.

As illustrated most clearly in FIG. 3, each cross-brace includes longitudinally spaced, laterally directed, forward and rear rectangular members, 50 and 52 respectively. The members 50, 52 fit closely within the respective front corner 54 and rear corner 56, formed at the edges of the upper channel 34. The members 50, 52 include upstanding forward ledge 58 and rear ledge 60, which fit closely against the underside 62 of adjacent door panels 22. To maintain a weathertight seal, a resilient gasket 64 is included on one of either the door panel or cross-brace and is captured between the same with the panel in a closed position. To compress the seal and assure a leakproof engagement, an over-center lock 66 (FIG. 5) is fixed to the roof and biases the door panel towards a closed position. The lock 66, the operation of which is conventional, includes an actuating arm 68 and a locking arm 70 which is urged against an outturned flange 72 formed integrally with the peripheral flange 30 of the door panel 22. As illustrated in FIGS. 2 and 4, two such locks 66 are preferably employed at the edge of each door panel, at positions indicated by the X'ed rectangles 67 in FIG. 2. Comparable locks 66 may also be employed, in pairs, to secure the cross-braces, and are included on the roof between the hinges on adjacent panels where indicated by the rectangles 73 in FIG. 6.

Figure 5:
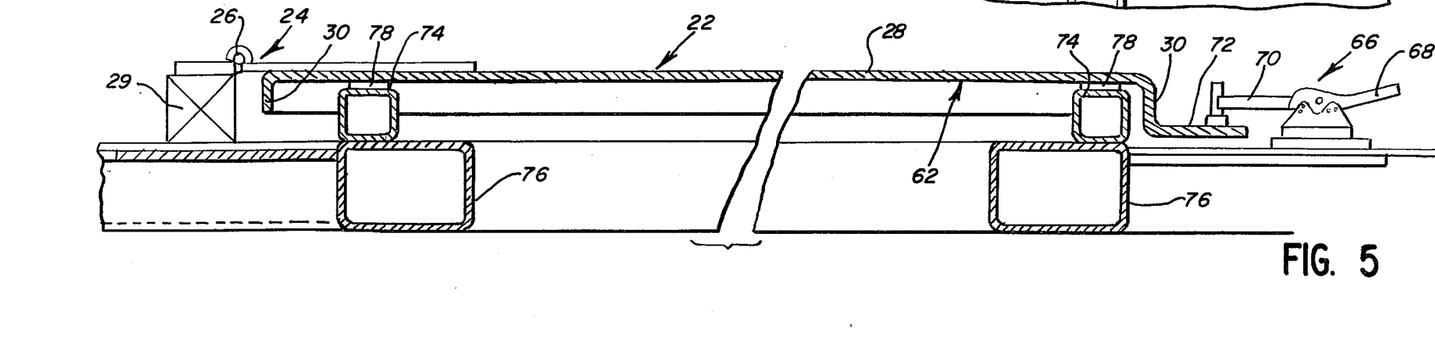
FIG. 5 is a sectional view of a door panel taken along line 5—5 of FIG. 4 and including a locking means to maintain the panel in a closed position.

A continuous rectangular seat for the door panels is formed cooperatively by laterally spaced seat members 74, shown in FIG. 5, which align with but are spaced slightly from the aforementioned members 50, 52 on the cross-braces. The seat members 74 are supported upon a pair of laterally spaced rigid members 76 which extend between the endwalls of the van and frame the side edges of the opening 20. Like members (not shown) may be extended between the sidewalls to frame the forward and rear edges of the opening. A gasket 78 is captured in like manner between the seat members and the underside of the panels to assure that the abutting region is sealed. It can be seen that the forward and rear members 50, 52, in conjunction with the web 80 of the cross-brace, define a conduit 81 to direct water and other foreign matter laterally off the roof of the van 12.

Figure 6:
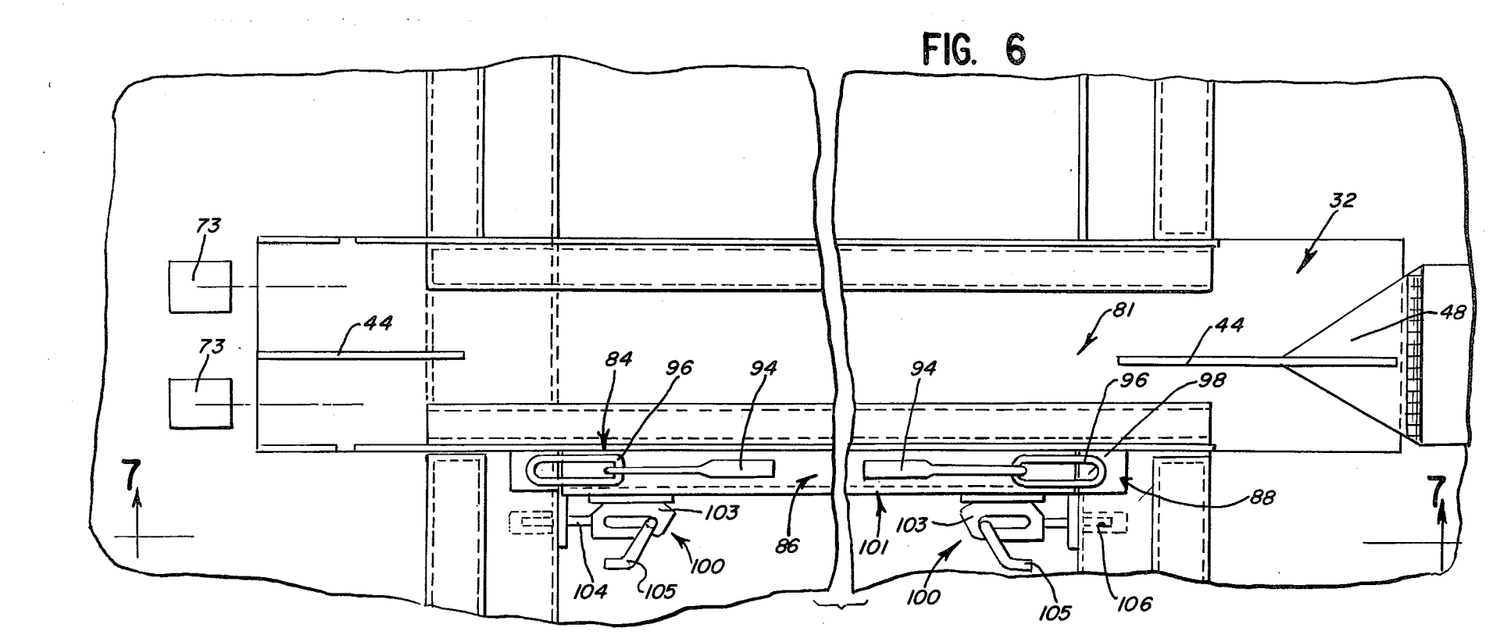
FIG. 6 is an enlarged sectional top view of one of the cross-braces including a tying means between the cross-brace and van.
Figure 7:
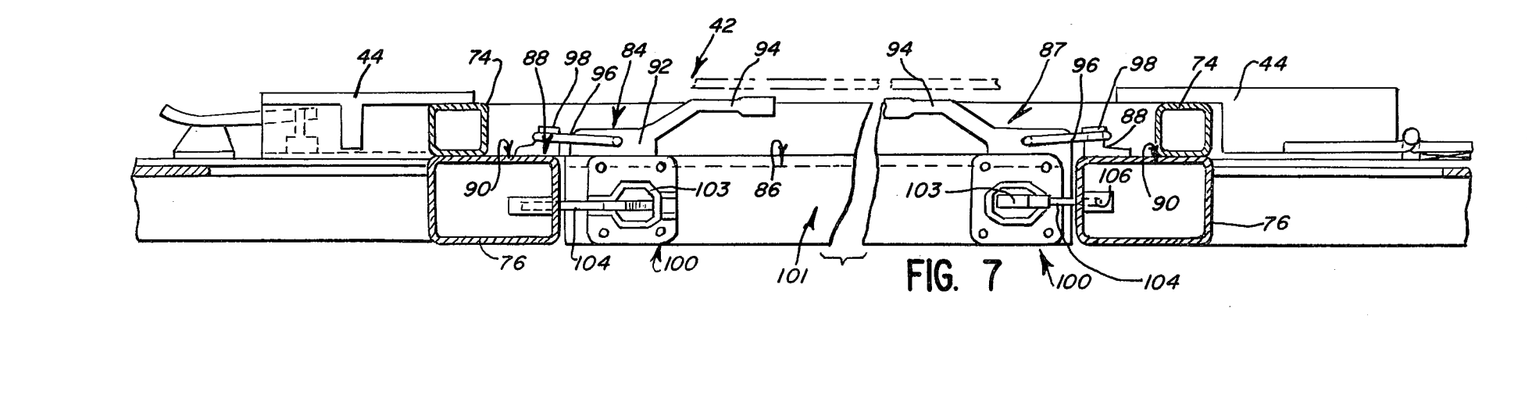
FIG. 7 is a sectional view of the cross-brace of FIG. 6 taken along line 7—7 of FIG. 6.

The details of the tying means 42 are shown in FIGS. 3, 6 and 7. The tying means comprise a latch 84 secured to the flat upper surface 86 of the lower channel 36 on the cross-brace 32 and a cooperating catch 88 secured to the upper surface 90 of the longitudinal frame member 76 on the van. A latch and catch are included preferably at each end of the cross-braces.

Generally, the latch 84, which is conventional, comprises a movable body portion 92, which is manipulable through an elongate lever arm 94. The body pivotally receives one end of an oval ring 96. The opposing end of the ring 96 is fit about an upwardly protruding lug 98 on the catch 88. With the latch and catch engaged, the cross-braces and roof are drawn positively towards one another, thereby maintaining the lateral dimension of the opening and stabilizing the opposing sidewalls.

The tying means 42 include also a centering assembly 100, fixed at each end of the cross-brace to the rearwardly facing surface 101 of the lower channel 36. The centering assembly 100 includes a bolt mechanism 103. The mechanism 103 comprises an elongate rod 104 which is actuated by a lever arm 105 through an internal mechanism whose operation is known in the art and does not form part of the present invention. The rod 104 is extendable within and retractable from a correspondingly configured bore 106 in the frame element 76. With the cylinder extended, the catch and latch are positively aligned with one another. The centering assembly also prevents relative longitudinal and vertical movement between the opposing sidewalls which the cross-braces span.

Figure 8:
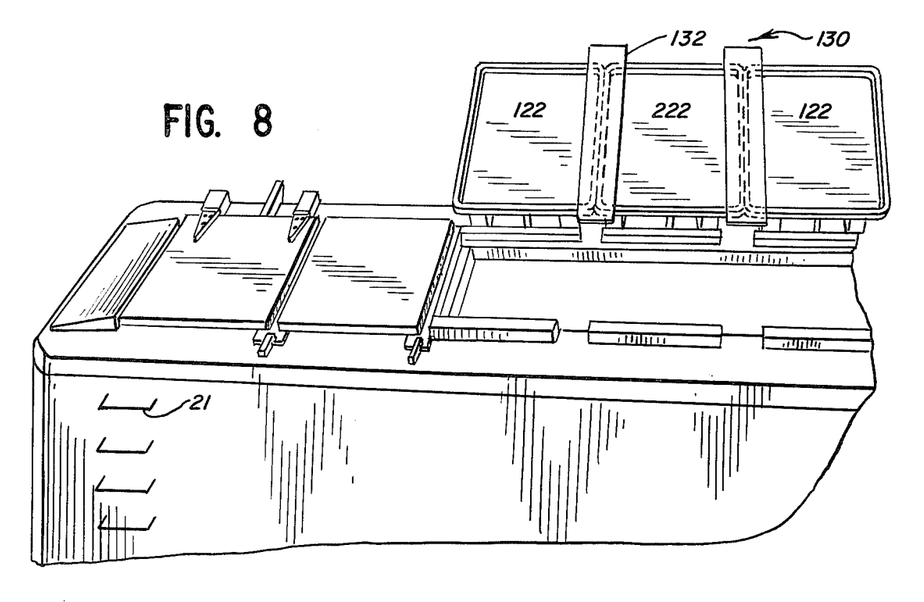
FIG. 8 is a sectional perspective view of an alternate embodiment of the overhead access assembly shown in a partially open state.
Figure 9:
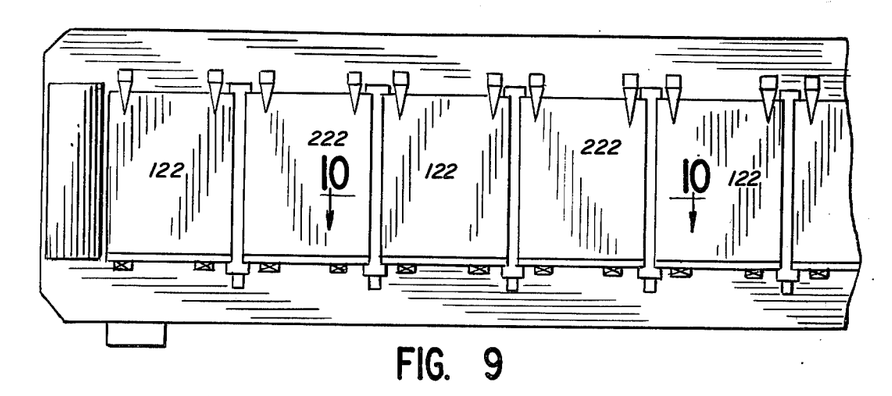
FIG. 9 is a top sectional view of the van in FIG. 8 with the door panels in a closed position.
Figure 10:
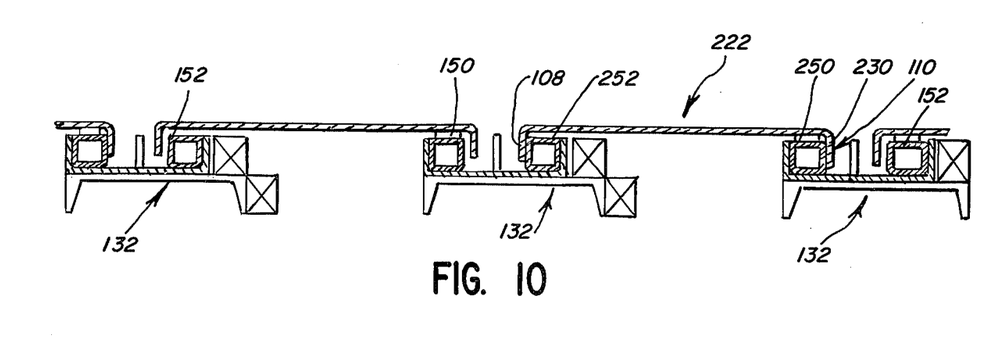
FIG. 10 is an enlarged sectional view of the door panels and cross-braces taken along line 10—10 of FIG. 9.

An alternate embodiment of the invention is illustrated in FIGS. 8-10. The structure in FIGS. 8-10 is the same in all material respects to the prior embodiment with the exception that the cross-braces 132, rather than being manipulable independently of the door panels 122,222, are rigidly fixed with the door panels so as to be movable therewith. In the illustrated arrangement, the cross-braces 132 are affixed to the forward and rear edges of alternate door panels 222. The door panels 122 on either side of the panels 222 carrying the cross-braces, seat against the cross-braces 132 upon forward and rear rectangular member, 150 and 152 respectively, as in the prior embodiment.

The peripheral downturned edge 230 of the panels 222 carrying the cross-braces 132, is spaced longitudinally to closely surround the forwardly and rearwardly facing surfaces, 108 and 110, respectively, of the rectangular members 250, 252 on adjacent cross-braces 232. The edge 230 is secured to the cross-brace as by welding, bolting, or other suitable means. With the described arrangement, alternate panels 122 can be selectively raised without disturbing the intermediate panels 222 carrying the braces.

It should be noted that the invention comprehends not only the above-described arrangement but any variations wherein either some or all of the cross-braces are secured to the panels. For example, a single cross-brace might be secured to each door panel. The door panels could then be raised successively from one end of the van to the other to create the desired opening size.

Figure 11:
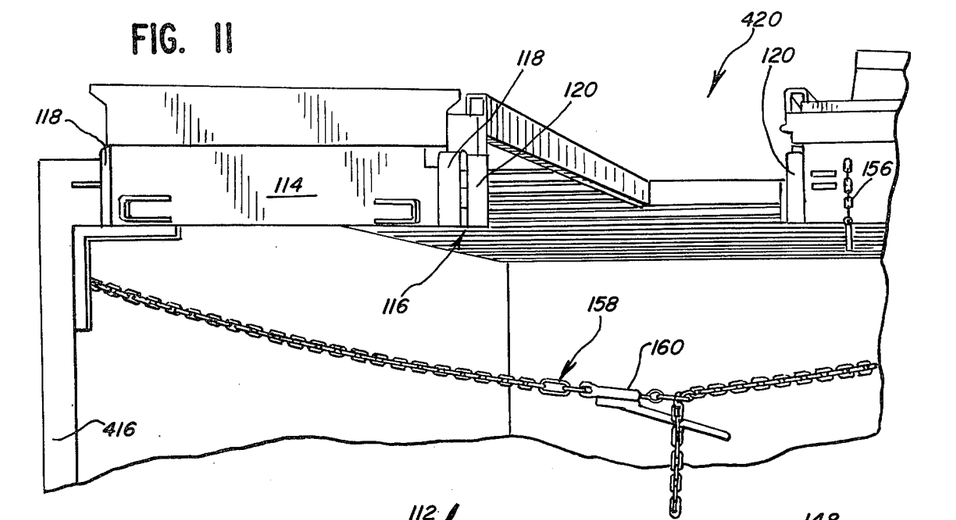
FIG. 11 is a sectional perspective view of a movable header assembly at the rear of the van.
Figure 12:
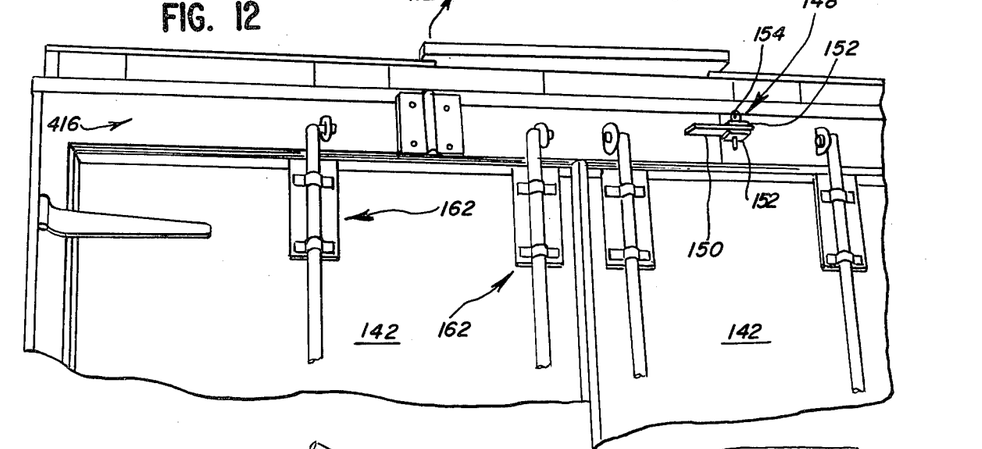
FIG. 12 is a sectional perspective view of the van with the header in a closed position.
Figure 13:
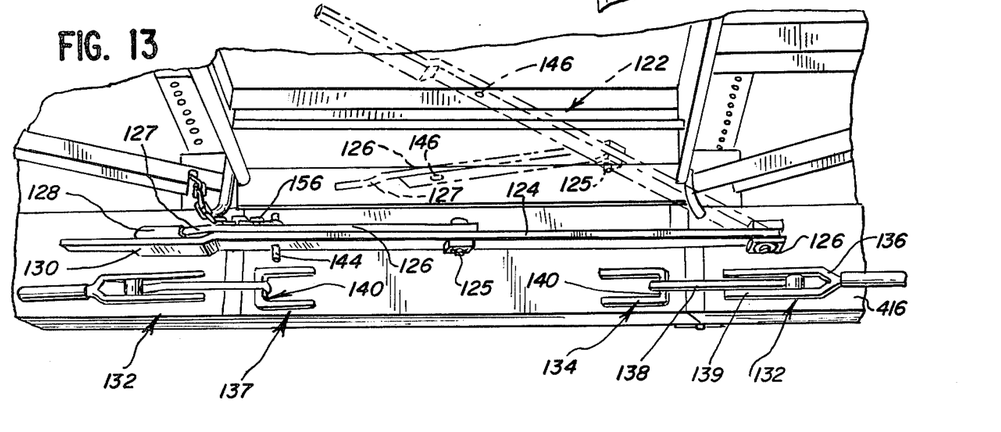
FIG. 13 is an enlarged sectional perspective view of a latching assembly for the header at the interior of the van, with an expanding assembly illustrated in an open position in phantom.

In FIGS. 11-13, a variation of the invention is shown wherein a continuous unrestricted opening can be created between an overhead opening 420 and an opening 112 in the endwall 416. A rear door movable header 114 is disposed at the rear of the van in the region between the overhead and lower openings. The header is hinged adjacent one end to the endwall at the edge of the roof opening 420. The ends 118 of the header 114 are tapered to closely abut correspondingly tapered surfaces 120 on the endwall at the opposing edges of the opening 420.

With the header closed as in FIG. 12, an expanding assembly 122 can be engaged at the interior of the van. The assembly 122, which is detailed in FIG. 13, comprises a lever arm 124 which is pivotally secured at one end 126 to the endwall 416, adjacent one edge of the opening 420. An elongate rod 126 is pivotally secured adjacent its one end 125 to an intermediate position on the lever arm. Adjacent the edge of the opening opposing that where the lever 124 is pivoted, is included a laterally opening cup 128 to receive the opposite end 127 of the rod 126. As the lever arm is manipulated between the open position, shown in phantom, and the closed position, the end of the rod is introduced to the cup. With the end of the rod bottomed against the cup, a force will be exerted against the edges of the opening, tending to expand the same as the lever arm 124 is moved to the fully locked position against the inside of the endwall. The lever arm is vertically offset at its end 130, so as to clear the cup 128 with the arm 124 in the closed position.

To counteract the expansion force exerted at the edges of the opening by the assembly 122, a latch 132 and catch 134 are included for cooperative engagement on the edges of the opening and header 114. While suitable latch and catch assemblies are well known in the art, the preferred arrangement is the illustrated over-center type. Specifically, the latch 132 includes a fork-shaped body 136 and an elongate hook 138, pivotally received between the legs 139 of the body 136. The end of the hook engages behind a wall 140 on the catch 134, integrally formed with the header 114. The latch, when closed, draws the edge of the opening towards the ends of the header. Together, the expansion assembly and the latch and catch arrangement positively maintain the opening at the rear of the van and afford a rigid endwall structure for mounting a pair of hinged doors 142.

To assure that the header 114 is positively locked, a pin 144 is inserted through the holes 146 in the rod 126 and arm 124, which holes coincide with the lever 124 in the locked position. An additional lock 148 is included at the exterior of the van. The lock comprises a flat, substantially horizontally extending plate 150 fixed to the header 114, which plate is received between a pair of spaced ears 152 at the edge of the opening. A pin 154 is extended through the plate 150 and ears 152 to secure the connection. The pins 144,154 are each suspended by a length of chain 156 in the vicinity of their respective connections so as to be readily available when locking the header.

A chain 158, with an intermediate length adjusting mechanism 160, is extended between the sidewalls adjacent the upper region of the van. The mechanism 160, whose structure is conventional, can be used to shorten the chain 158 and thereby draw the sidewalls together so that the header can be secured.

With the header locked, the rear doors can be closed against the endwall and header as in FIG. 12. Suitable locks 162 are included on the doors and engage the upper region of the endwall and header. The construction of the locks 162 is well known in the art and does not form part of the present invention. It should be noted that, while the illustrated arrangement shows an opening in the rear endwall, a movable header might be employed equally as effectively above an opening in either or both of the sidewalls, which opening can be used in conjunction with a roof opening to accomplish overhead loading and unloading of freight as contemplated by the invention.

The foregoing description was made for purposes of clarifying the operation of the invention, with no unnecessary limitations to be derived therefrom.

What is claimed is:

1. In a load carrying vehicle having a freight compartment formed cooperatively by a floor, laterally spaced sidewalls, opposed endwalls, and a roof member, the improvement comprising:
   a framed opening in the roof member through which access may be gained to said compartment to accomplish loading and unloading of freight;
   a plurality of hinged door panels for sealing said framed opening, each said door panel being selectively pivotable between an open and closed position;
   at least one cross-brace spanning the framed opening and serving as a seat for said door panels, said cross-brace being hingedly secured adjacent one edge to said roof member so as to be pivotable substantially away from said roof opening; and
   means for rigidly tying the ends of said cross-brace with said roof member, said means preventing shifting of the ends of the cross-brace relative to the roof member such that the cross-brace positively maintains the dimension of the roof opening as well as provides overall stability to the freight compartment;
   said door panels and cross-brace being selectively pivotable away from the opening to create a desired opening size and to gain access to different regions of the freight compartment.

2. The load carrying vehicle of claim 1 wherein said cross-brace resides between adjacent door panels and seats an edge of each said adjacent door panel to afford additional rigidity to said door panels and to provide a weatherproof seal over the opening.

3. The load carrying vehicle of claim 1 wherein said means comprise a latch adjacent one of either the end of said cross-brace or the edge of the roof member defining said framed opening, and a catch engageable with the latch adjacent the other of either the end of the cross-brace or the edge of the roof member, said catch and latch serving to positively draw the edge of the roof member and cross-brace towards each other when said latch and catch are in an engaged position, thereby preventing expansion of said framed opening.

4. The load carrying vehicle of claim 1 wherein said door panels each comprise a substantially horizontally disposed cover surface having a peripheral downturned edge, and said cross-brace includes an upstanding ledge to seat beneath said cover surface, said peripheral downturned edge serving to deflect rain or other foreign matter away from the point of engagement between said door panel and upstanding ledge.

5. The load carrying vehicle of claim 1 wherein said cross-brace is fixed to one of said door panels so as to be movable therewith.

6. The load carrying vehicle of claim 2 wherein a gasket is included on one of either said door panels or cross-brace, said gasket being captured between said door panels and cross-brace when the door panels are in a closed position so as to maintain a weathertight seal therebetween.

7. The load carrying vehicle of claim 3 wherein said means include a centering assembly, said centering assembly comprising a bolt mechanism on one of either said cross-brace or roof member, said bolt mechanism including a rod which is extendable within and retractable from a bore in the other of either said cross-brace or roof member, said bolt mechanism serving to positively align the catch and latch and also to prevent horizontal or vertical shifting of the cross-brace relative to the roof member.

8. In a load carrying vehicle having a freight compartment formed cooperatively by a floor, laterally spaced sidewalls, opposed endwalls and a roof member, the improvement comprising:
   an elongate framed opening in the roof member through which access may be gained to said compartment to accomplish loading and unloading of freight;
   a plurality of door panels for sealing said opening, each said door panel being hinged adjacent one edge for pivoting movement between an open and closed position, said door panels being pivoted laterally outwardly in the open position;
   at least one laterally directed cross-brace extending between the edges of the opening, said cross-brace being secured so as to be movable away from said opening and serving as a seat for said door panels;
   means for rigidly tying the ends of said cross-brace with said roof member, said means preventing lateral expansion of said opening and sidewalls and also serving to prevent relative longitudinal or vertical shifting of the sidewalls;
   said door panels and cross-brace being selectively pivoted away from the opening to create a desired opening size or to gain access to different regions of the freight compartment.

9. The load carrying vehicle of claim 8 wherein said opening is framed by a pair of spaced, longitudinally directed members spanning the length of the freight compartment and mating with the endwalls.

10. The load carrying vehicle of claim 8 including a lock assembly on said roof member engageable with each door panel to bias the door panels towards a closed position.

11. The load carrying vehicle of claim 8 wherein said cross-brace comprises a web joining a pair of spaced laterally directed upstanding ledges which seat closely against the underside of adjacent door panels.

12. The load carrying vehicle of claim 8 wherein said means comprise a latch adjacent one of either the end of the cross-brace or the edge of the roof member defining said framed opening, and a catch engageable with the latch adjacent the other of either the end of the cross-brace or the edge of the roof member, said catch and latch serving to positively draw the edge of the roof member and cross-brace towards each other when said catch and latch are in an engaged position and thereby preventing lateral expansion of the framed opening.

13. The load carrying vehicle of claim 8 wherein said cross-brace and door panels are each hinged for rotation about a substantially horizontal, longitudinally extending axis and said cross-brace and door panels are hinged on opposing sides of the framed opening.

14. The load carrying vehicle of claim 12 wherein said means include a centering assembly, said assembly comprising a bolt mechanism on the cross-brace, said bolt mechanism including an elongate rod which is extendable within and retractable from a bore in the longitudinal frame members, said bolt mechanism preventing relative longitudinal or vertical shifting of the opposing sidewalls, thereby affording additional overall rigidity to the freight compartment.

15. The load carrying vehicle of claim 14 wherein said latch and centering assembly are on a common side of the cross-brace such that the latch and centering assembly are accessible to and can be manipulated by an individual situated upon a closed door panel immediately there adjacent.

16. A load carrying vehicle having a freight compartment with an open upper region formed cooperatively by a floor, laterally spaced sidewalls, and opposed endwalls, the improvement comprising:
a plurality of hinged door panels for sealing the open upper region of said freight compartment, each said door panels being selectively pivotable between an open and closed position;
at least one cross-brace spanning the sidewalls and serving as a seat for said door panels, said cross-brace being hingedly secured adjacent one edge to one sidewall so as to be pivotable outwardly therefrom; and p1 means for rigidly tying the ends of said cross-brace with said sidewalls, said means serving to prevent shifting of the ends of the cross-brace relative to the sidewalls such that the cross-brace positively maintains the spacing of said sidewalls and prevents relative longitudinal shifting thereof;
said door panels and cross-brace being selectively pivotable away from the opening to create a desired opening size and to gain access to different regions of the freight compartment.

17. The load carrying vehicle of claim 16 wherein said means comprise a latch adjacent the end of the cross-brace and a cooperating catch on the sidewall, said latch and catch serving to positively draw the cross-brace and sidewall toward each other when in an engaged position so as to prevent spreading of the sidewalls.

18. The load carrying vehicle of claim 17 wherein said means include a centering assembly, said assembly comprising a bolt mechanism on one of either the cross-brace or sidewall, said bolt mechanism including an elongate rod which is extendable within and retractable from a bore in the other of either the cross-brace or sidewall.

19. In a load carrying vehicle having a freight compartment formed cooperatively by a floor, laterally spaced sidewalls, opposed endwalls, a roof member, and a first access opening formed within one of either said sidewalls or endwalls, the improvement comprising:
a second opening in said roof member providing overhead access to said freight compartment to accomplish overhead loading and unloading of freight;
a plurality of hinged door panels for sealing said second opening, each said door panel being independently pivotable between an open and closed position;
a plurality of cross-braces spanning the second opening and serving as a seat for said door panels, said cross-braces being hingedly secured adjacent one edge so as to be pivotable substantially away from the second opening,
means for rigidly tying the ends of said cross-braces with said roof member such that the cross-brace positively maintains the dimension of the opening as well as provides increased overall stability to the freight compartment;
a movable header above said first access opening; and
second means for rigidly tying the ends of the header with the opposing edges of said first access opening such that said header rigidly maintains said first opening, said header being movable so as to create an unrestricted region between said openings such that freight suspended by an overhead cable can be introduced to said freight compartment through the first opening.

20. The load carrying vehicle of claim 19 wherein said header is hingedly secured adjacent one edge so as to be pivotable outwardly away from said first access opening.

21. The load carrying vehicle of claim 19 wherein said means comprise a latch and catch cooperatively arranged at at least one end of the header and the edge of the first access opening, said latch and catch serving to draw the end of the header toward the edge of the first access opening when in an engaged position.

22. The load carrying vehicle of claim 19 wherein said means comprise additionally an expansion assembly which engages between the opposing edges of the first access opening and exerts a force against the edges of the first access opening which tends to expand the same and counteracts the force exerted by the latch and catch, said latch and catch and expansion assembly positively maintaining the first access opening and solidifying the roof member and rear endwall in the vicinity of the first and second openings.

23. The load carrying vehicle of claim 19 including a stop member on the roof which abuts the door panels and maintains the panels in an open position.

* * * * *